United States Patent Office 2,747,763
Patented May 29, 1956

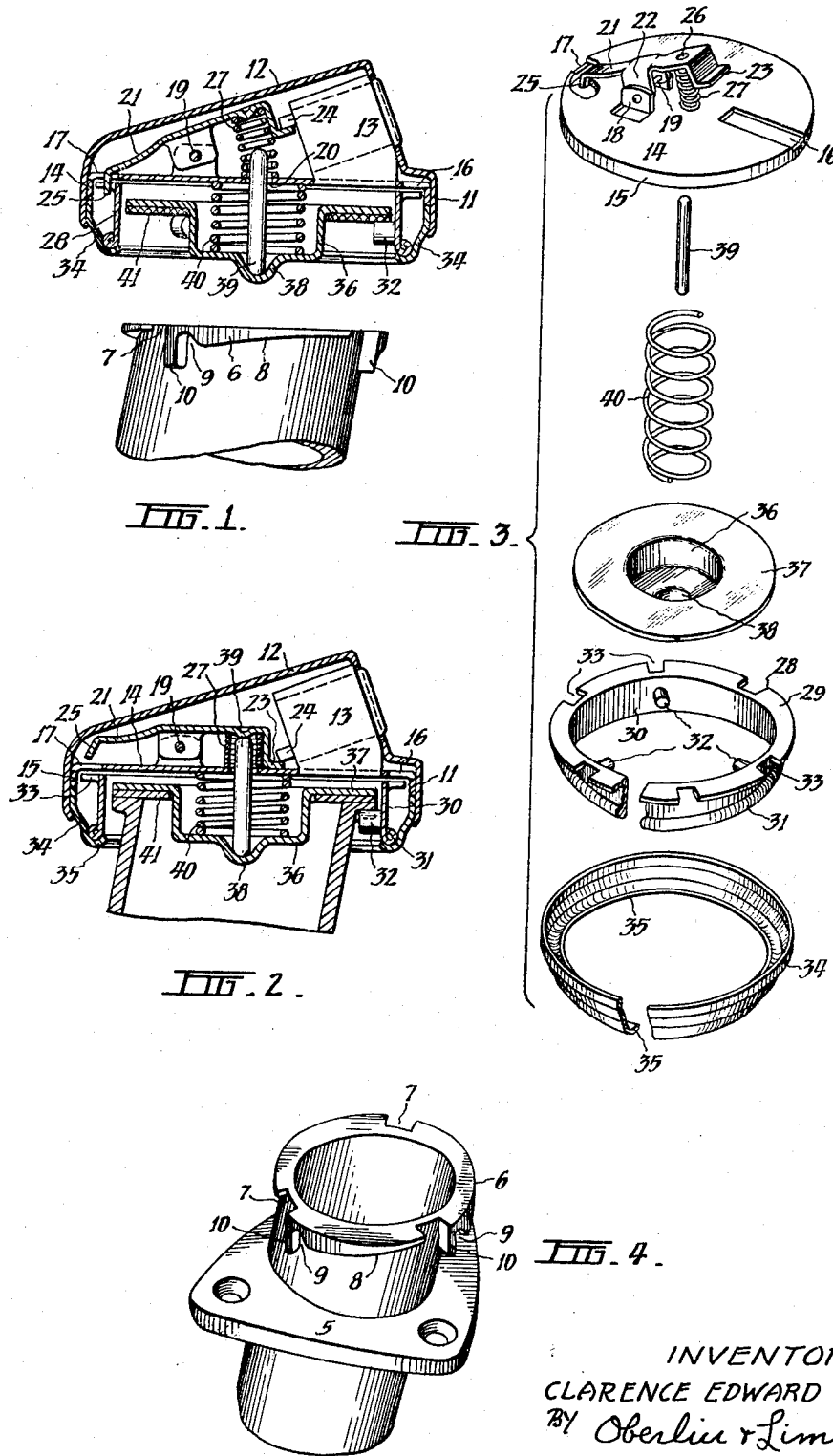

2,747,763
CLOSURE CAPS FOR THE FILLER NECKS OF AUTOMOBILE PETROL TANKS

Clarence Edward Sach, Ivanhoe, near Melbourne, Victoria, Australia

Application October 30, 1951, Serial No. 253,778

Claims priority, application Australia November 1, 1950

4 Claims. (Cl. 220—40)

This invention relates to a new and improved closure cap for the filler necks of automobile petrol tanks and refer particularly to a lockable closure cap of the so-called spinner type—that is to say, a closure cap having a cover which will rotate freely relative to a filler neck when the closure cap is fitted to the filler neck and locked thereon.

It is known to provide a spinner-type closure cap suitable for use with filler necks having inturned locking flanges—a so-called "inside locking" spinner cap. One construction of such a closure cap is described in U. S. specification No. 1,908,593. Such "inside locking" spinner caps have been made largely by die-casting operations. However, it has been proposed to manufacture an "inside locking" spinner-type closure cap of sheet metal construction. But although it has been known, prior to this present invention, to manufacture lockable closure caps of "outside locking" type—that is to say, closure caps suitable for use with filler necks having outturned locking flanges—as far as I am aware there has not yet been manufactured a spinner-type lockable closure cap of "outside locking" type.

The outside locking caps as previously made have included a type of cap comprising a cover, a lock in the cover, pins projecting radially inwards from the periphery of the cover so as to be adapted to engage with external flanges or ramps on the outer end of a filler neck, and a spring loaded sealing member adapted to press upon the outer end of the filler neck and reduce liability of petrol loss, the lock being so arranged as to be adapted to clamp the sealing member tightly against the filler neck—so that the cover cannot be depressed relative to the sealing member and filler neck—with the object of preventing the pins being disengaged from the external flanges or ramps of said filler neck. But such a closure cap may be opened, even when locked, by the use of a suitable spanner or wrench which, when engaged with the cover of the closure cap, will provide sufficient leverage to overcome the locking engagement of the pins in the rams resulting from the pressure of the sealing member upon the end of the filler neck.

There are several problems associated with the development of an "outside-locking" spinner-type closure cap for the filler necks of automobile petrol tanks even in view of the prior knowledge of "inside locking" spinner-type closure caps. For example, whereas it is relatively simple to devise an "inside-locking" spinner-type closure cap having the locking means not accessible to any person who may desire to effect the unauthorised removal of a closure cap from a filler neck (the closure cap having the locking devices so located that they fit within the filler neck and are, therefore, not accessible), it is a difficult matter to enclose the locking devices in an outside-locking cap.

Furthermore, with the customary design of filler neck having external locking flanges the closure cap must have catch members adapted to engage beneath the flanges in such manner that the cap is locked in position by an upward or clamping pressure applied to the catch members in such manner that they cannot normally be disengaged from the locking flanges. And in order to provide for a spinner-type cap the cover of the cap must be freely rotatable relative to the means for applying the clamping pressure. In addition, the closure cap must be so made that it cannot be loosened by vibration. A further consideration is that the closure cap must be of compact design as a large cap will provide a grip to enable it to be torn off the filler neck.

The primary object of this invention is to provide a lockable closure cap of the spinner type which will be suitable for use with filler necks having external locking flanges. A further object of the invention is to provide an "outside locking" closure cap, for fitment to the filler neck of an automobile petrol tank, of such design that the cover of the cap, when the cap is locked, will be adapted to spin relative to the filler neck without disengaging the locking members from the outside flanges of the filler neck. A dependent object is to devise a lockable closure cap, of the spinner type, which will be adapted for locking engagement with external flanges of a filler neck and which will be capable of being made in an economical manner largely by sheet metal pressing operations.

The lockable closure cap devised with these and other objects in view comprises, broadly, a cover having in it means for closing the mouth of the filler neck, a spinner member mounted within the cover so as to be rotatable relative to the cover, interlocking means on the spinner member for engaging with the external flanges of a filler neck so as to hold the spinner member on the filler neck, means for releasably applying a clamping pressure to the spinner member so that the interlocking means thereon will grip tightly on the external flanges of the filler neck, and means for releasably locking the spinner member relative to the cover so that when so locked the spinner member may be turned simultaneously with the cover. When the spinner member is not locked relative to the cover said cover may be turned without causing the spinner member to become disengaged from the external flanges of the filler neck.

Fastened within the cover is a lock by means of which the clamping and locking means within the cover are operated, and there is a fixed plate which is non-rotatable relative to the cover. The clamping and locking means are supported by the fixed plate and the parts of the closure cap are so arranged that when the lock is operated in one direction the spinner member will be held relative to the fixed plate (and, therefore, relative to the cover). By turning the cover the spinner member may then be engaged with or disengaged from the external flanges of the filler neck. By turning the lock in the opposite direction the spinner member will be released from its engagement with the fixed plate so that it will be permitted to have rotational movement relative to the fixed plate—when the cover may be turned freely relative to the spinner plate.

In order to prevent—or make extremely difficult—unauthorized removal of the closure cap by the method of engaging a suitable tool with the interlocking members on the spinner member there is provided a sealing member so arranged that it is adapted to seat upon the upper or outer end of the filler neck in customary manner, and also to be actuated by the lock so that when the cover is adapted to turn or rotate relative to the spinner member the sealing member will then be clamped relative to the interlocking means on the spinner member and the unauthorized rotation of said spinner member will be prevented or made extremely difficult.

In order that the invention will be clearly understood and readily put into practical effect, I shall now describe in detail one particular construction of lockable, spinner-type, closure cap made according to my invention. This construction of cap is depicted in the accompanying sheet of illustrative drawings wherein:

Fig. 1 shows the top of a filler neck in side elevation and the closure cap, in readiness to be placed thereon, in vertical cross-section;

Fig. 2 is a vertical cross-section of the closure cap in locked position on the filler neck;

Fig. 3 illustrates in perspective the several parts of the closure cap, including the cover and the lock; and Fig. 4 is a perspective view of the filler neck, showing the design and arrangement of the external locking flanges.

The filler neck, upon which is adapted to be engaged the closure cap according to the invention, has a flange member 5 by means of which the filler neck is secured to the body of the automobile and, at its upper end three external flanges 6 separated by openings 7, the three openings being equidistantly spaced about the top of the filler neck. Each flange 6 has on its underside a ramp 8 ending with a recess 9 and a stop 10. This is a commercial construction of filler neck which the cap according to my invention is made to fit.

The closure cap has a cover 11 which is of substantially circular shape in plan view and formed with a diametrically aligned embossment 12. This embossment is of tapering shape with one end of a radius or size suitable to house the lock 13, the embossment tapering evenly down to the peripheral surface of the cap at the opposite end so as to provide for a neat appearance. In the enlarged end of the embossment 12 there is formed an opening through which is fitted the outer end or face portion of the lock 13, which is a standard commercial item and adapted to be operated by a suitable key.

The fixed plate 14 is of such a diameter that it fits tightly within the cover 11 and it has a flange 15 about its periphery. In the plate 14 is a radial slot 16 in which is engaged a land provided on the base of the lock 13 so that the plate 14 is thereby held against rotational movement relative to the lock 13 and to the cover 11. At a position diametrically opposite the slot 16 there is an opening 17, and intermediate of the slot 16 and opening 17 are two opposed lugs 18 formed with holes for the accommodation of a pivot pin 19, the lugs being pressed out of the material of the plate 14. Between the lugs 18 and the slot 16, at about the center of the plate 14, there is provided a hole 20. The latching means consist of a lever 21 formed with a pair of downturned lugs 22 having holes through which fits the pivot pin 19, so that the lever 21 is thereby mounted pivotally relative to the fixed plate 14. At its inner end the lever 21 is formed with a platform 23 which is adapted to bear against the operating pin 24 of the lock 13, and the opposite or outer end of the lever 21 is formed as a finger 25 which is adapted to fit through the opening 17 in the plate 14. A dimple 26 is formed in the lever 21 as a means for locating the one end of a light helical compression spring 27, the opposite end of the spring seating on the plate 14 about the center opening 20 therein. The lever 21 is so proportioned that when the lock 13 is operated in such manner that the pin 24 is raised—to the position most distant from the plate 14—then the finger 25 of the lever 21 will project through the opening 17 in the plate 14, but when the lock is operated so that the operating pin 24 is moved close to the plate 14 then the finger 25 will be retracted from the opening 17.

The spinner member 28 has a flat ring portion 29 of such diameter that it fits neatly and rotatably within the peripheral flange 15 of the fixed plate 14 and integral with the ring 29 is a short cylindrical part 30. The end of the part 30 opposite to the ring portion 29 is turned outwardly or beaded at 31 so that the spinner member is somewhat of the form of an annular channel. Fastened to the cylindrical part 30 of the spinner member are three inwardly-directed, substantially radial pins 32 which are arranged in equally spaced relationship. The ring portion 29 has a series of notches 33 formed in it at equal arcuate spacing.

The spinner member 28 is retained rotatably but non-removably in position against the fixed plate 14 by means of a retaining member 34 which is, in turn, secured within the skirting of the cover 11. This member 34 is of circular shape so that it fits neatly within the skirting of the cover 11, being held in position by an inturned edge portion of that skirting, and it has an inturned flange 35 which fits about the beaded portion 31 of the spinner member and thereby prevents access to the notches 33 in the ring portion 29. The retaining member is held in fixed position relative to the cover 11 but is so fastened that the spinner member 28 is permitted freedom of rotational movement when the latch finger 25 is in disengaged position. The internal diameter of the inturned flange 35 is substantially the same as the internal diameter of the cylindrical portion 30 of the spinner member.

The notches 33 of the spinner member are adapted to register with the opening 17 in the fixed plate 14 and the latch finger 25 is of such length that it is adapted to engage in any selected one of the notches 33 when it projects through the opening 17, and when so engaged it will hold the spinner member 28 against rotation relative to the fixed plate 14.

There is also provided a sealing member 36 formed with a cylindrical portion and an out-turned peripheral flange 37 which is of smaller diameter than the internal diameter of the cylindrical part 30 of the spinner member but greater diameter than a circle touching the inner ends of the radial pins 32. That is to say, the sealing member 36 will fit within the spinner member 28 but will not slide flatwise past the pins 32. At its mid-point the sealing member is recessed, 38, to provide a seating for one end of a short rod 39 which fits slidably through the central hole 20 in the fixed plate 14 so as to be adapted to make contact with the underside of the lever 21. A helical compression spring 40 is accommodated within the cylindrical portion of the sealing member 36 so that one end bears upon said member 36 whilst its opposite end bears upon the underside of the fixed plate 14. A gasket 41 is provided on the outerside of the flange 37, being held in position by the radial pins 32. Normally the sealing member 36 will be forced outwardly relative to the cover 11, the outward movement being limited by the three radial pins 32 secured to the spinner member 28.

When it is desired to fit the closure cap to the filler neck of an automobile petrol tank an appropriate key is inserted in the lock 13 and the key turned so that the operating pin 24 is moved to its uppermost position—as illustrated in Fig. 1. Then, the lever 21 will be moved pivotally by the spring 27 to release the short rod 39 and thereby enable the sealing member 36 to move linearly towards the fixed plate 14, and the finger 25 of the lever 21 will fit through the opening 17 in the peripheral portion of the fixed plate. If the spinner member 28 be in suitable angular position the finger 25 will also engage in one of the recesses 33 in the top or ring member 29 of the spinner member 28 so as to hold the spinner member 28 against rotation relative to the fixed plate; but if the spinner member is not in such a position as to permit engagement of the finger 25 in one of the recesses 33 it will be turned to such a position when the cap is applied to the filler neck, and the finger 25 will immediately engage in a recess 33 and hold the spinner member against further rotation relative to the fixed plate.

The cap may then be conveniently fitted to the filler neck, the radial pins 32 of the spinner member fitting through appropriate openings 7 in the external flange 6 of the filler neck and, by turning the cap, those pins will ride on the underside of the ramps 8 and will be caused to engage in the recesses 9. The pins 32 will be caused to grip in the recesses 9 by the pressure of the spring 40 which acts to press the cap, except the sealing member 36, upwardly relative to the filler neck. The sealing member 36 is pressed downwardly upon the upper end of the filler neck so as to close the opening therein.

To lock the closure gap in position the key in the lock 13 is turned so as to cause the operating pin 24 on the lock to engage with the platform 23 of the latching lever 21 and press it downwardly towards the fixed plate 14—see Fig. 2. The finger 25 at the opposite end of the latching lever is then disengaged from the particular recess 33 in the spinner member 28 and from the opening 17 in the fixed plate 14 so that the cover 11, lock 13, and fixed plate 14 (with the latching means thereon) may be permitted to turn relative to the spinner member 28. The movement of the lever 21 will also be such that the rod 39 will be caused to press the sealing member 36 downwardly and clamp it and its gasket 41 tightly upon the end of the filler neck, at the same time applying an upward pressure to the cover 11 and spinner member 28 so that the radial pins 32 will be locked in the recesses 9 provided in the underside of the peripheral flange members 6 of the filler neck. The spinner member 28 will, therefore, be held against rotation.

If rotational pressure be applied to the cap the member 34 and cover 11 (with the lock 13, fixed plate 14 and lever 21) will, of course, spin relative to the spinner member 28 and sealing member 36. As there is very little frictional resistance between the cover 11 and the spinner member 28 there will be imparted to the spinner member such a very small turning force that the spinner member 28 will not be turned. As the pins 32 are clamped tightly within the recesses 9 by the upward pressure applied to the spinner member 28 by the rod 39 acting through the latching lever 21, fixed plate 14, cover 11 and member 34, and as they are partly protected by the stops 10, it will not be conveniently possible to turn the spinner member 28 for the purpose of removing the cap from the filler neck by engaging some particular tool with those radial pins, particularly as it is customary practice to make the filler neck relatively short so that there is very little room between the underside of the cap and the body work of the automobile.

The cap may be conveniently removed by operating the lock 13 so that downward pressure upon the relative end of the lever 21 and upon the rod 39 is released. Then the finger 25 may be engaged in an appropriate recess 33 so that the spinner member 28 will be caused to rotate when the cover 11 is turned, and the pins 32 permitted to be disengaged from the recesses 9.

The cover 11, the fixed plate 14 with its latching lever 21, the spinner member 28, the sealing member 36 and the retaining member 34 may all be conveniently made by sheet metal pressing operations and, with the lock 13, springs 27 and 40 and rod 39, may be conveniently assembled. Consequently, the cost of production of the cap will be relatively low.

It will be found in use that the cap made according to this invention will possess a relatively high utility and I believe that it will be efficient in its operation as it will provide a relatively good seal against loss of petrol and it will not be convenient to remove the cap—without first operating the lock so that the spinner member 28 will turn with the cover 11 or without extensively damaging either the cap or the filler neck.

It will be appreciated that the several parts comprising the cap may be modified in their shape or in their construction.

Furthermore, in the specification and appended claims such words or phrases which indicate direction—as downward pressure—are to be considered as being used to indicate the appropriate direction when the closure cap is fitted to an upwardly extending filler neck of an automobile petrol tank, with the inlet opening at the top of the filler neck.

What I do claim is:

1. A closure cap, for an externally-flanged filler neck of an automobile petrol tank, including a cover, a spinner member rotatably mounted in the cover, the spinner member comprising a flat ring portion with a recess and an integral short cylindrical portion with an outwardly-beaded edge and being rotatably mounted within the cover, a circular retaining member for said spinner having a flange turned in under the lower edge of the spinner, inwardly-directed pins on said spinner engageable with the externally-flanged filler neck, sealing means in the cover closing the mouth of the filler neck, a fixed flat plate within said cover, a lever mounted on said fixed plate and having one end engageable in the recess in said spinner member thereby holding it against rotation relative to the cover, means tilting the lever engageably into the said recess, and means pivoting said lever in disengagement.

2. A closure cap according to claim 1 wherein said fixed plate has an opening, and the end of said lever is projectable through the opening when it is moved to position, and said spinner plate also having its recess registrable with the opening in the fixed plate.

3. In a closure cap for an externally-flanged filler neck of an automobile petrol tank having a cover and sealing means in the cover to close the mouth of the filler neck, the combination of a spinner member comprising a flat ring portion and an integral short cylindrical portion with an outwardly beaded edge and being rotatably mounted within the cover, a circular retaining member for said spinner and having a flange turned in under the lower edge of the spinner, said cylindrical portion of the spinner having interlocking means engageable with the externally-flanged filler neck, a flat horizontal fixed plate within said cover having a slot, a sealing member in the cover engageable on the mouth of the filler neck, clamping means including a rod bearing upon the sealing member and a compression spring disposed betwen said fixed plate and the sealing member, and releasable locking means engaged in the slot of the fixed plate for holding the spinner member relative to the cover, said locking means in its condition releasing the spinner member operating to force the rod against the sealing member and compress the spring between the latter and the fixed plate.

4. In a closure cap for an externally-flanged filler neck of an automobile petrol tank having a cover and sealing means in the cover to close the mouth of the filler neck, the combination of a spinner member comprising a flat ring portion and an integral short cylindrical portion with an outwardly beaded edge and being rotatably mounted within the cover, a circular retaining member for said spinner and having a flange turned in under the lower edge of the spinner, said cylindrical portion of the spinner having interlocking means engageable with the externally-flanged filler neck, a flat horizontal fixed plate within said cover having a slot, a sealing member in the cover engageable on the mouth of the filler neck, a rod one end of which bears against the sealing member, a lever pivotally mounted on the plate and having a portion disposed to extend through the slot of the same for releasable engagement with the spinner member, a spring turning the lever in one direction, and a lock turning the lever in the opposite direction, the lever pressing the rod against the sealing member with a reactive force upon the spinner member.

References Cited in the file of this patent

UNITED STATES PATENTS

| | | |
|---|---|---|
| 1,462,404 | White | July 17, 1923 |
| 1,702,205 | Freedman | Feb. 12, 1929 |
| 1,702,532 | Boomer | Feb. 19, 1929 |
| 1,903,892 | Carney | Apr. 18, 1933 |
| 1,908,593 | Fortune | May 9, 1933 |
| 1,989,979 | Greenberg | Feb. 5, 1935 |

FOREIGN PATENTS

| | | |
|---|---|---|
| 757,683 | France | Oct. 16, 1933 |
| 46,391 | France | Mar. 24, 1936 |
| | (First addition to No. 776,659) | |
| 50,011 | France | Aug. 1, 1939 |
| | (Second addition to No. 776,659) | |